United States Patent [19]

Woodroffe et al.

[11] Patent Number: 4,922,840

[45] Date of Patent: May 8, 1990

[54] SULFUR EQUILIBRIUM DESULFURIZATION OF SULFUR CONTAINING PRODUCTS OF COMBUSTION

[75] Inventors: Jaime A. Woodroffe, Andover; Jeevan S. Abichandani, Malden, both of Mass.

[73] Assignee: Avco Research Laboratory, Inc., Everett, Mass.

[21] Appl. No.: 287,731

[22] Filed: Dec. 21, 1988

Related U.S. Application Data

[63] Continuation of Ser. No. 173,873, Mar. 28, 1988, abandoned.

[51] Int. Cl.$^5$ ............................................. F23J 11/00
[52] U.S. Cl. .................................. 110/345; 110/216; 110/347
[58] Field of Search ............... 110/260, 261, 263, 264, 110/266, 342, 344, 345, 347, 216, 343; 431/4, 9; 423/244

[56] References Cited

U.S. PATENT DOCUMENTS

| | | |
|---|---|---|
| 2,718,453 | 9/1955 | Beckman . |
| 3,475,121 | 10/1969 | Thornton . |
| 4,178,349 | 12/1979 | Wienert ........................ 110/345 X |
| 4,300,480 | 11/1981 | Schoppe et al. ..................... 431/9 |
| 4,309,393 | 1/1982 | Nguyen ........................... 110/345 X |
| 4,427,362 | 1/1984 | Dykema ............................ 110/345 |
| 4,440,100 | 4/1984 | Michelfelder ....................... 110/345 |
| 4,517,165 | 5/1985 | Moriarty .......................... 110/344 X |
| 4,517,904 | 5/1985 | Penterson et al. .................... 110/264 |
| 4,555,996 | 12/1985 | Torbov et al. ....................... 110/345 |
| 4,613,487 | 9/1986 | Yoon et al. ........................ 110/343 |
| 4,616,574 | 10/1986 | Abrams et al. ...................... 110/343 |
| 4,655,148 | 4/1987 | Winship ............................ 110/347 |
| 4,676,177 | 6/1987 | Engstrom .......................... 110/245 |

OTHER PUBLICATIONS

"Eval. of Calcium Impregnated Coal as a Fuel for Turbine Combustors", Battelle, Columbus Labs, Prcdngs of 2nd Annual Heat Eng. Contrs Mtg, Fossil Energy, May '85.
"Tech Status of EPS's LIMB Program", Martin, G. B. et al, EPA/EPRI NOx Symposium, Boston, MA, May 1985.
"TRW Slagging Combustor Systems Tests", Stansel, J. et al, Sixth International Coal Utilization Conference, Houston, Texas, Nov. 1983.
"Toroidal Flow Pulverized Coal-Fired MHD Combustor", Stankevics, J. O. A. et al., Third Coal Technology Europe Conference, Amsterdam, The Netherlands, Oct. 1983.

Primary Examiner—Edward G. Favors
Assistant Examiner—Denise L. Ferensic
Attorney, Agent, or Firm—Perman & Green

[57] ABSTRACT

A method of combustion of a sulfur-containing fuel which substantially reduces the amount of gaseous sulfur compounds which would otherwise be emitted. A sorbent is injected into products of combustion in the temperature range of about 1600-2400 K. and above resulting from the combustion, gasification or the like, of a sulfur-containing fuel and controlling gas-sorbent particle mixing, gas diffusion, forward and reverse reaction kinetics, particle size, particle temperature, and sorbent particle residence time in the products of combustion to effect substantially maximum capture of sulfur by the sorbent particles and thereafter removal of the sorbent particles before any substantial amount of sulfur captured by the sorbent is lost back to the products of combustion from which it was removed.

15 Claims, 2 Drawing Sheets

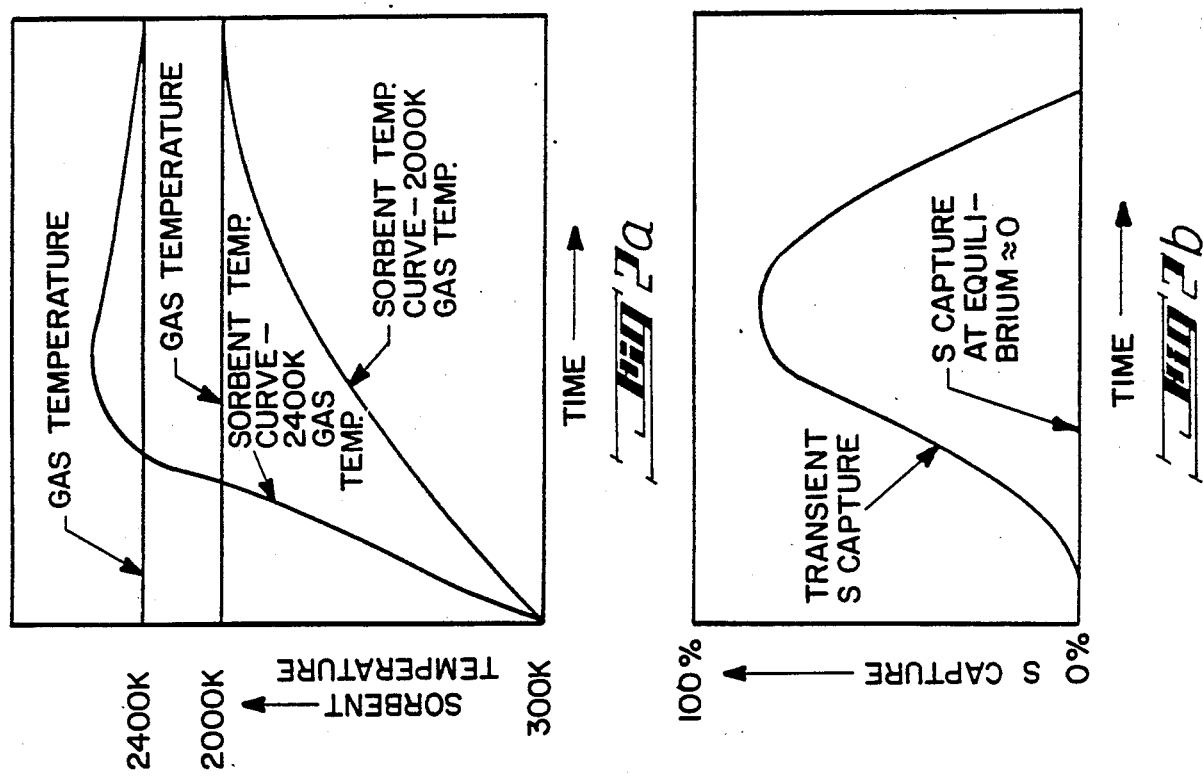
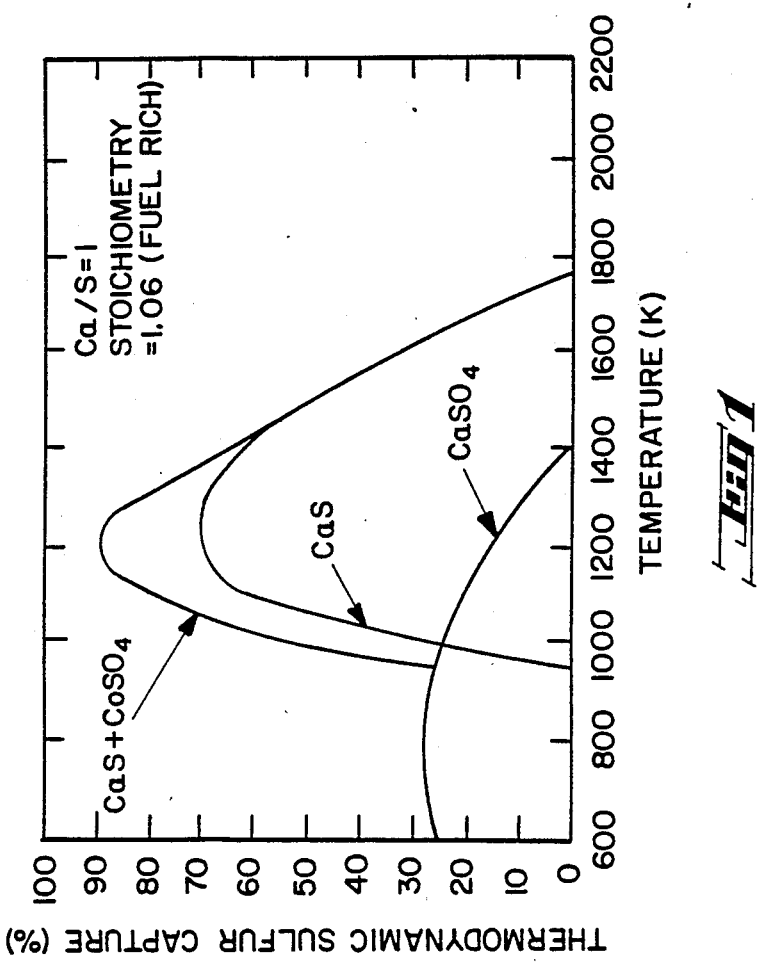

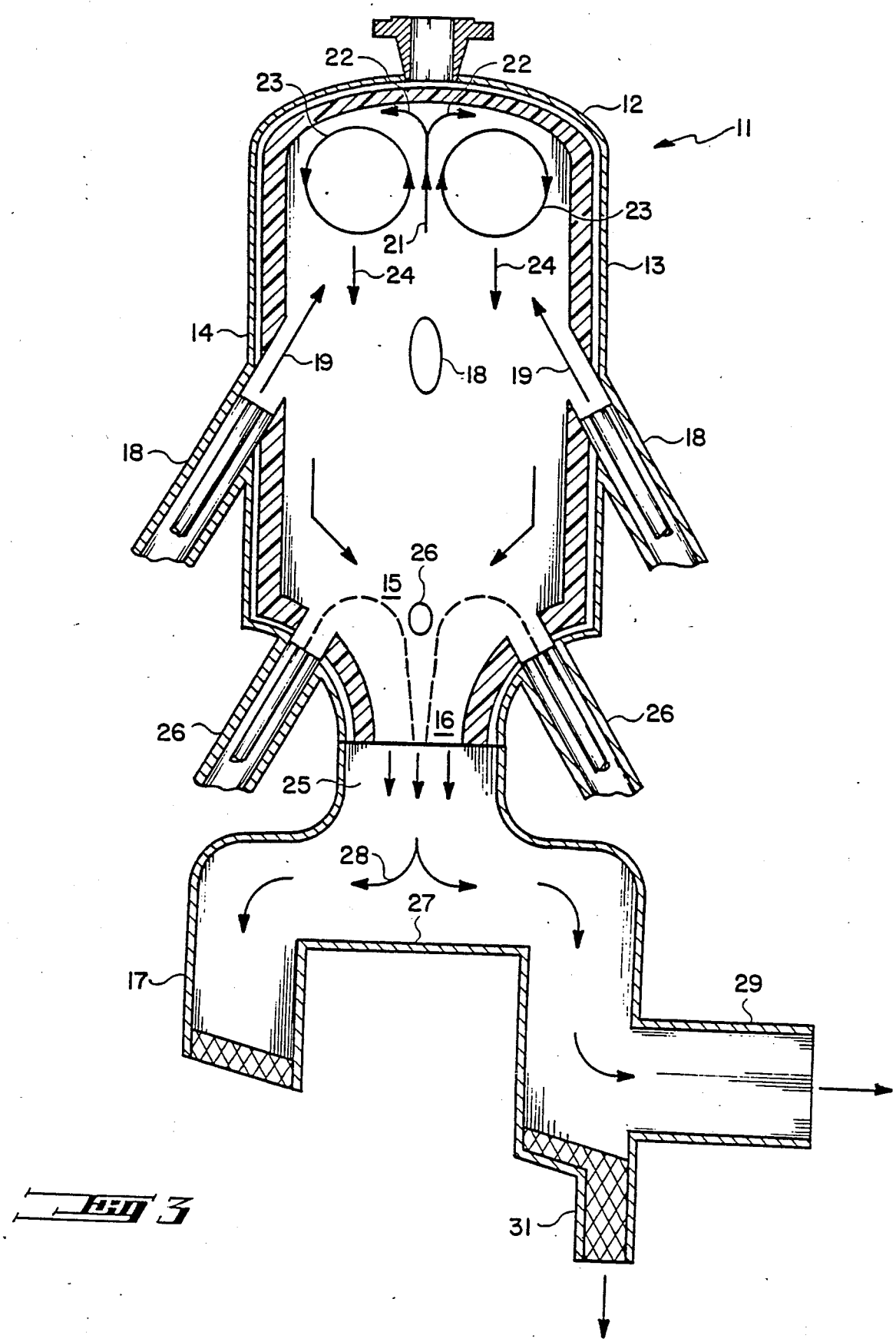

SULFUR EQUILIBRIUM DESULFURIZATION OF SULFUR CONTAINING PRODUCTS OF COMBUSTION

This application is a continuation of Ser. No. 07/173,873 filed Mar. 28, 1988 and now abandoned.

FIELD OF THE INVENTION

The present invention relates to super-equilibrium desulfurization of sulfur-containing products of combustion produced by the combustion and gasification of sulfur-containing fuels.

For years there has been and still is an increasing concern with the immediate and long-term problems resulting from pollution of the atmosphere. With this concern has come an awareness at all levels that steps must be taken to halt the increasing pollution and especially reduce the present pollution levels. As a result of this awareness, a substantial amount of money and effort is being spent by business and governmental agencies to develop standards and measures for preventing significant discharge of pollutants into the atmosphere. Among the pollutants of concern are gaseous sulfur compounds present in the waste gases discharged from refining and chemical plants and the flue gases from power plants which generate electricity by combustion of fossil fuels. The gaseous sulfur compounds may be present in many forms, such as H S, COS, SO, and the like. These gaseous compounds are released into the atmosphere, come into contact with oxygen and moisture, and can react to form sulfuric acid, resulting in the so-called "acid rains", known to be detrimental to both aquatic and plant life.

Principally, three approaches have been utilized in attempts to reduce the emission of gaseous sulfur compounds. They are (1) removal of the sulfur constituents from the fuel prior to its combustion or partial combustion by physical and/or chemical benefaction, (2) post processing treatment of flue gas (known as flue desulfurization or FGD) such as scrubbing of the gaseus effluent to remove the sulfur constituents prior to its release into the atmosphere and (3) use of an additive to react with the sulfur during combustion. To obtain substantially complete removal of the sulfur constituents prior to combustion requires the use of expensive solvents for extraction of the sulfur components which also extract a significant fraction of the fuel energy. Such methods have not proven to be altogether satisfactory in view of both cost and effectiveness. The predominant method now practiced for removal of the sulfur constituents comprises scrubbing the effluent gases with an absorbent for removal of the sulfur constituents prior to discharging the gases into the atmosphere. A disadvantage with this approach, however, is the high capital and operating costs involved in treating the large volumes of effluent gas to remove the small quantity of dispersed gaseous sulfur components. Indeed, for an average utility power plant, the cost of a facility for treating the effluent gas can be in excess of $100 million.

Much effort has been directed to attempting to react the sulfur compounds present in the fuel with a sorbent additive to form solid compounds during the combustion process. Advantages of this approach are that: (1) the sorbent can be placed in more intimate contact with the fuel sulfur compounds and, therefore, the sorbent treats a higher concentration of these sulfur compounds; (2) the capture of the fuel sulfur in a solid, easily removal form may be accomplished in the burner; and (3) the solid sulfur compounds can then be removed by existing separation equipment, which is normally used for the removal of liquid slag, and/or ash constituents of the fuel.

The first mentioned approach of benefaction, such as froth flotation, magnetic desulfurization and the like is, in addition to the reasons previously noted, further unsatisfactory it is insufficient to meet present day emission limits. The second approach of post processing such as gas scrubbing and other FGD processes has the additional disadvantage that it is expensive to install and operate and also is expensive and difficult to maintain.

In addition to the reasons noted above, the third approach of injection of sorbents during processing is attractive because it has the potential of being very effective and, at the same time, avoids the problems of slurry and sludge handling associated with wet processes. However, this approach has the disadvantages that heretofor it has required an excessive amount of sorbent to obtain a high percentage of removal and is limited to relative low combustion gas temperatures.

Thus, such prior art injection processes are limited to use in systems where gas temperatures are less than about 1500 K. This is simply because such sorbents such as calcium are operative only in the temperature range of about 1100–1500 K. However, most combustion processes are preferably operated at much higher temperatures of about 2200 K. or more for combustion processes and about 1800 K. for gasification processes. Unfortunately, above about 1500 K. the thermodynamic capacity of calcia to retain sulfur in the solid form decreases rapidly, and is almost zero at about 2000 K. Therefore, heretofore, the use of sorbents has been restricted to low temperature processes or post processing where the temperature at the point of injection and/or temperature downstream thereof to the point of removal is less than about 1500 K. In these cases, and only these cases, such injection processes are not thermodynamically limited. See for example, "Evaluation of Calcium Impregnated Coal as a Fuel for Turbine Combustors," Battelle Columbus Laboratories, Proceedings of the Second Annual Heat Engine Contractors Meeting, Fossil Energy, May 1985, pp. 94–103. In this paper a Battelle proprietary coal treatment process is described as retaining about 75% sulfur in the solid phase at a temperature of 1475 K. However, it was also stated that a strong inverse temperature-dependence on in situ sulfur retention in the temperature regime greater than 1475 K. was incurred.

U.S. Pat. No. 4,517,165 discloses a fossil fuel process utilizing absorbent injection providing high sulfur removal preferably utilizing a plurality of combustors, all of which were limited to operation in the low temperature regime wherein the sorbent is not thermodynamically limited.

Researchers at the Environmental Protection Agency reported in 1985 50–60 percent sulfur retention at gas temperatures ranging between 1150–1560 K in about one second of contact time using many sorbents including limestone, calcined lime, and pressure hydrated lime (LIMB process). See Martin, G. B. and Abbott, J. M., "Technical Status of ESP's LIMB Program," EPA/EPRI NOx Symposium, Boston, MA, May 1985. Further, TRW, Inc. reported injection of limestone in a slagging combustor operating at temperatures of 1475–2100 K. However, they reported only modest success of 10-45 percent capture with Ca/S ratios ranging from one to six. See Stamsel, J., Sheppard, D., and Petrill, E., "TRW's Slagging Combustor Systems Tests," Sixth International Coal Utilization Conference, Houston, Tex., November 1983.

SUMMARY OF THE INVENTION

The present invention is directed to the removal of sulfur and the like by a suitable sorbent from gases in the temperature range of 1600-2400 K. and above under super-equilibrium conditions, i.e., under conditions where the equilibrium value is essentially zero by utilizing the transient thermal nonequilibrium of sorbent particles disposed in and carried by such high temperature gas.

Broadly, the present invention comprises injecting into products of combustion in the temperature range of about 1600-2400 K. resulting from combustion or gasification of a sulfur-containing fuel, a sorbent such as, for example, an inorganic alkaline sorbent and controlling gas-sorbent particle mixing, gas diffusion, forward and reverse reaction kinetics, particle size, particle temperature, and particle residence time in the products of combustion whereby high sulfur capture by the sorbent particles is effected and such particles are removed from the products of combustion before any substantial amount of the fuel sulfur constituent captured by the sorbent particles is lost.

Practice of the present invention permits effective control of the emission of gaseous sulfur from high temperature combustion systems by capture by a sorbent in the products of combustion at temperatures of 1600-2400 K. and above in the combustor. Practice of the present invention provides a novel and advantageous method of removing sulfur compounds from products of combustion at temperatures not hereinbefore possible. Thus, the present invention, as distinguished from the prior art, provides efficient capture of sulfur compounds and their consequent easy removal at higher temperatures than heretofore possible.

Practice of the present invention further provides a novel and advantageous method for controlling emission of gaseous sulfur to levels at or below present day Federal emission limits from combustion systems operating at temperatures not heretofore possible without resort to substantial sulfur removal by fuel benefaction before coal processing (combustion, gasification, liquefaction, etc.) and/or post processing treatment (flue gas desulfurization).

BRIEF DESCRIPTION OF THE DRAWINGS

FIG. 1 is a graphical representation of the equilibrium capture by Calcia of sulfur as calcium sulfide (CaS), calcium sulfate (CaSO), and CaS+CaASO under reducing conditions as a function of temperature;

FIG. 2a is a graphical representation of expected increases in temperature of sorbent particles with time for two representative gas temperatures;

FIG. 2b is a graphical representation of the lag in time of a typical transient sulfur capture of sorbent particles behind this thermodynamic equilibrium curve as illustrated in FIG. 2; and FIG. 3 is a schematic view in cross section of a combustor in accordance with and for practicing the invention.

DETAILED DESCRIPTION OF PREFERRED EMBODIMENT

It has been pointed out hereinabove that the use of chemical sorbents such as calcia has heretofore been restricted to low temperature processes or post processing where in either case the processing temperature is limited to a maximum of about 1500 K. Why this is true can be seen from FIG. 1 which shows equilibrium sulfur capture under reducing conditions for typical compounds. FIG. 1, for example, shows very clearly why the previously mentioned Batelle process was subject to the noted strong inverse temperature-dependence on in situ sulfur retention in the high temperature regime of about 1475 K. This dependence is, of course, the direct result of the steep decline in the thermodynamic-potential of calcium to retain sulfur as shown in FIG. 1.

Directing attention now to FIG. 2a and FIG. 2b, these two related figures broadly illustrate the basic concept of the present invention. FIG. 2b illustrates transient sulfur capture as the sorbent particles heat up in the background gas as shown in FIG. 2a. Sorbent particle temperature profiles as illustrated by way of example in FIG. 2a can be controlled by, inter alia, particle size, mode and location of particle injection, gas temperature, and particle-gas contact time. Due to the transients involved, actual sulfur capture as shown in FIG. 2b lags behind the thermodynamic equilibrium curves as shown in FIG. 2a (based on instantaneous sorbent particle temperature). For purposes of simplicity and convenience, it is assumed that the sorbent particles attain uniform temperature. In actual practice temperature gradients are created in the particles which affect the curve for actual sulfur capture, but the nature of the curve will remain substantially as shown in FIG. 2b.

In accordance with the invention, the sorbent particles are removed, as more fully disclosed hereinafter, from the reacting medium at the time when actual sulfur capture is at its highest.

Referring now to FIG. 3, there is shown by way of example a representative illustration to schematic cross sectional form of a combustor 11 in accordance with and for practicing the invention. The term "combustor" as used herein means a device wherein fuel and air are brought together, mixed to form a combustible mixture, and combusted to provide the desired composition of combustion products.

The combustor 11 as shown in FIG. 3 is of the type known as entrained slagging coal combustors developed for magnetohydrodynamic power generation systems and boiler retrofit applications. For a more complete discussion of this type of combustor see "Toroidal Flow Pulverized Coal-Fired MHD Combustor," J. O. A. Stankevics, A. C. J. Mattsson, and D. B. Stickler, Third Coal Technology Europe Conference, Amsterdam, The Netherlands, October 1983, and "Development of Retrofit External Slagging Coal Combustor System," Proceedings Second Annual Pittsburgh Coal Conference, Sept. 16-20, 1985, which are herein incorporated by reference as if set out at length. Briefly, the combustor 11, which is preferably operated in the vertical position as shown, has an upper dome portion 12, a cylindrical section 13, a fuel-air injection portion 14, a sorbent injection portion 15, an exiting nozzle 16, and a bottom impact separator portion 17. This type of slagging combustor provides an upper jet driven toroidal vortex field, slagging walls, and slag carrying sorbent removal.

Coal fuel and preheated air are introduced in conventional manner through upwardly directed coaxial injection nozzles 18 equally spaced around the intermediate periphery of the cylindrical portion 13. This coaxial injection provides intense mixing of the reactants and rapid coal particle heat-up and devolatization thereby minimizing the time required for heterogeneous coal char burnout. The inflowing jets of coal particles exiting from the coal injection nozzles 18 designated by the arrows 19, coalesce near the combustion centerline and form a substantially vertical jet designated by the arrow 21, directed toward the stagnation region of the top combustor dome portion 12. Ignition having been provided in conventional manner, the now reacting flow is turned to form a radial sheet flow 22 which in turn forms toroidal vortexes 23 at the outer periphery of the dome portion 12. These trapped toroidal vortexes 23 driven by the reactant input from the coal injection nozzles 20 mixes the incoming coal particles and air with hot combustion products which provides favorable ignition characteristics and promotes highly efficient, rapid and stable combustion. Jet impact and radial acceleration of the recirculating vortex flow in the top dome portion is the prime mechanism for inertial separation of generally liquid slag particles from the combustion gases and slagging of the combustor walls. Thus, the aforementioned combustion gases in the combustor contain particulate matter. As used herein the term "particulate matter" includes not only slag in solid, semi-solid and liquid form, but also sorbent and ash and any other constituent the coal may contain. A small amount of wall burning by burnout of remaining char deposited on the walls with ash mineral matter from the larger coal particles may be expected. The combustion products formed in the manner described above leave the vortex 23 in the dome portion as a low subsonic plug flow 24 and a self-renewing slag coating forms on the walls of the combustor. The slag formed on the walls serves as an insulating layer and minimizes heat losses and wall erosion. Some of the slag as particulate matter also leaves the combustor with the exiting combustion gases.

While it is not necessary for maximum sulfur capture, combustion may be carried out fuel rich in conventional manner for the subsequent prevention of the formation of undesirable nitrous oxides.

The sorbent is introduced just upstream of the outlet 25 of the the exiting nozzle 16 through sorbent injection nozzles 26, in an amount to provide a molar combining ratio of sorbent to sulfur compounds of from about 1.0:1 to 3.0:1, as and for the purposes hereinafter more fully described. The sorbent particles exiting from the sorbent injection nozzles 26 are uniformly dispersed in the products of combustion and entrained liquid slag flow and are carried with it to and through the exiting nozzle 16. Closely spaced to the nozzle outlet 25 is an impact type particle separator 17 which functions to separate the particulates, including both slag and sorbent, carried with the combustion gases exiting from the combustor. In those cases where the degree of removal of particulates by impact separation is not deemed adequate, such may be followed by a high efficiency cyclone separator (not shown). The combustion gases are accelerated by the exiting nozzle 16 and directed to a closely spaced collector plate or surface 27 which is perpendicular to the gas flow exiting the nozzle 16. Combustor operating parameters including particle sizes are preferably chosen to maximize particle impact on the collector plate 27 where they are separated from the gas stream 28 which continues on and exits the separator 17 via pipe 29. If desired, baffle plates, deflectors or the like (not shown) may be provided at or just past the edges of the collector plate 27 and disposed in the gas stream to facilitate removal of those particles which are small enough to follow the gas streamlines curving around and past the collector plate 27. Combined slag and sorbent are removed from the bottom of the collector as at outlet 31.

The present invention is applicable to a wide variety of sulfur containing fuels such as, for example, liquids, petroleum products and by-products, crude petroleum, and petroleum residue and the like. The invention is equally applicable to fuels in solid form such as, for example, asphalt, coal, coal tars, lignite and combustible municipal or organic waste. Such solid fuels are ordinarily pulverized and fed to the combustor in suspension in a carrier gas or water. In the practice of the invention with solid fuels such as coal, the coal is preferably ground such that at least 70% and preferably 95% will pass through a 200 mesh screen. The fuel together with a source of oxygen such as preheated air is introduced into the combustor through fuel-air injection nozzles 14 and ignited in conventional manner to preferably provide products of combustion at a pressure of up to six atmospheres or more and temperatures of 2400 K. or more. In accordance with the invention the fuel/air mixture may be a stoichiometric mixture to insure that all of the fuel and its sulfur is gasified before the sorbent is introduced since this will insure the subsequent maximum removal or capture of the sulfur contained in the fuel. In the present invention the upper temperature limit of the combustor gases is dictated only by economics, materials of construction, and application requirements. It is to be clearly understood that the upper temperature limit is not limited by any necessity of avoiding temperatures that will rsult in decomposition of any solid sulfur compounds formed by the reaction between gaseous sulfur compounds and the sorbent and/or temperatures that otherwise prevent the formation of solid sulfur compounds. This is so simply because, in accordance with the invention, maximum capture of gaseous sulfur occurs as the sorbent particles heat up to their maximum reaction temperature and hence maximum capability to capture sulfur and are then removed from the hot gases, i.e., to limit their residence time, before any substantial decomposition of previously formed solid sulfur can occur.

Operation at the higher temperature of, for example, 2400 K. subsequently results in maximum heat treating of the sorbent particles thereby providing maximum capability of the sorbent to capture the sulfur. The sorbent is introduced into the high temperature products of combustion downstream of and separate from the introduction of the fuel and preferably after complete combustion of the fuel. Thus, for a combustor of the type shown in FIG. 3 the sorbent is introduced just upstream of the nozzle exit 25 whereby the resident or flight time of the sorbent particles from their point of injection to the separator plate 27, which is to say the point at which they are separated from the products of combustion, is not substantially greater than that required for the sorbent particles to reach the point of and achieve maximum sulfur capture. The desired flight time is typically about 25-35 msec. The actual flight time of the sorbent particles is the most important consideration in the removal of the sorbent particles. While it cannot be completely ignored, residence time of the sorbent particles in the slag in the separator is of lesser importance since the rate of sulfur decomposition in the slag is relatively quite slow due to the absence of oxygen as well as a relatively low temperature of the slag. The temperature of the slag in the separator can be controlled by the provision in conventional manner of appropriate cooling (not shown) to reduce the temnperature to a suitable or desired value to insure minimum sulfur decomposition.

The sorbent particles are preferably ground to a size such that about 95% will pass through a 325 mesh screen, but a size greater than about 10 microns to provide maximum retention in the separator. Under typical operating conditions particles above about 5–7 microns will be removed in the separator. To insure a uniform distribution of sorbent particles in the gas exiting the combustor a plurality of equally spaced flat spray nozzles may be used and be angled counter to the gas flow as shown in FIG. 3 to provide adequate residence or flight time and to promote mixing between the hot gas and sorbent particles.

In view of the proceeding discussion it will now be apparent to those skilled in the art that additional combustor stages as may be desired, such as, for example, for control of $NO_x$ emissions, can be added downstream of the separator since substantially very little if any sulfur, either gaseous or solid, it will be present in the gases after this point. Further, the addition of such stages will be greatly simplified, costs reduced and efficiency increased as compared to prior art practices since the presence or possible presence of sulfur in the gases in any significant amounts will not have to be taken into consideration in the design and operation of these stages.

The foregoing description illustrates a specific embodiment of the invention and what is now considered the best mode of practicing it. Those skilled in the art will understand that changes may be made in the form of the invention without departing from its generally broad scope. Specifically, while the invention has been described, among other things, with respect to the utilization of a vertical entrained flow slagging combustor, it will be readily apparent that other types of combustors may be utilized. Thus, non-vertical slagging combustors as well as horizontal, cylindrical, or other conventional types may be utilized so long as, broadly, the introduction and separation of fuel and sorbent, combustion, residence time of sorbent in the gases, and separation of sorbent is observed and practiced in accordance with the invention and as taught hereinabove. Further, wide choices in fuel and sorbent are available as well as fuel-air ratios, operating temperatures and separation techniques. These and numerous other variations will be readily apparent to those skilled in the art. Accordingly, it is to be understood that within the scope of the appended claims the invention may be practiced otherwise than as specifically illustrated and described.

We claim:

1. The method for the combustion of a carbon-and sulfur-containing fuel for substantially reducing emission of gaseous sulfur compounds formed during combustion of the fuel in a combustion zone having one or more fuel inlets and one or more oxidizer inlets, and having a combustion products outlet spaced therefrom, and having one or more inorganic sorbent inlets downstream of said fuel inlet(s) and oxidizer inlet(s) and upstream of said combustion products outlet, comprising:
   (a) introducing a carbon-and sulfur-containing fuel into said fuel inlet(s) and introducing an oxidizer comprising an oxygen-containing gas into said oxidizer-inlet(s);
   (b) combusting said fuel to produce combustion products in said combustion zone at a temperature greater than about 1600 K., said combustion products including gases, particulate combustion matter and gaseous sulfur compounds;
   (c) maintaining the temperature of said combustion products, in the area of said sorbent inlet(s), at a temperature greater than that at which decomposition of condensed phase compounds formed by reaction between gaseous sulfur compounds and sorbent begins, and
   (d) substantially uniformly introduced through said sorbent inlet(s) and into said combustion products, upstream of said combustion products outlet, inorganic sorbent(s) in particulate form in an amount sufficient to react with at least a substantial portion of the gaseous sulfur compounds in said combustion products to form particulate reaction products which exit said combustion products outlet with said particulate combustion matter and said gases.

2. The method of claim 1 which comprises cooling the combustion gases downstream of said combustion products outlet to achieve cooling of the condensed phase reaction products of said sulfur compounds with said sorbent(s).

3. The method of claim 1 which comprises directing said gases, particulate combustion matter and particulate reaction products to a separation location immediately downstream of said combustion products outlet and separating at least a substantial portion of said sulfur-sorbent reaction products from said gases at said separation location.

4. The method of claim 1 which comprises introducing oxygen as said oxidizer, in a total amount sufficient to provide at least substantially complete conversion of the carbon-and-sulfur-content to the fuel to gaseous form.

5. The method of claim 1 which comprises introducing said sorbent(s) to said combustion zone in an amount to provide a molar combining ratio of sorbent or sulfur compounds of from about 1.0:1 to 3.0:1.

6. The method of claim 1 which comprises maintaining the temperature of said combustion products in said combustion zone from about 1600 K. to about 2400 K.

7. The method of claim 3 which comprises maintaining said combustion products at a location upstream of said separation location for a time sufficient to provide at least substantially complete gasification of the carbon and sulfur content of the fuel.

8. The method of claim 1 which comprises maintaining said combustion products at a location upstream of said sorbent inlet(s) for a time sufficient to provide at least substantially complete gasification of the carbon and sulfur content of the fuel.

9. The method of claim 1 wherein the combustion process occurs at a fuel-to-oxidant stoichiometry of about 1.0.

10. The method of claim 1 which comprises controlling the residence time of said sorbent(s) in said combustion products to between 25 to 35 milliseconds.

11. The method of claim 3 which compress cooling in said separation location to a temperature substantially less than that at which decomposition of solid sulfur compounds formed by reaction between gaseous sulfur compounds and said sorbent begins.

12. The method of claim 1 wherein a major portion of said sorbent(s) will pass through a 325 mesh screen but has a size greater than about 10 microns.

13. The method of claim 2 which comprises controlling the residence time of said sorbent in said combustion products between the point of injection and the point of substantial cooling to between 25 and 35 milliseconds.

14. The method of claim 3 which comprises controlling the residence time of said sorbent in said combustion gases to between 25 and 35 milliseconds.

15. The method of claim 11 which comprises controlling the residence time of said sorbent in said combustion gases to between 25 and 35 milliseconds.

* * * * *

UNITED STATES PATENT AND TRADEMARK OFFICE
CERTIFICATE OF CORRECTION

PATENT NO. : 4,922,840

DATED : May 8, 1990

INVENTOR(S) : Woodroffe et al.

It is certified that error appears in the above-identified patent and that said Letters Patent is hereby corrected as shown below:

Claim 1, col. 8, line 19 replace "introduced" with --introducing--.

Col. 8, Claim 4, line 43 thereof, replace "to the fuel" with --in the fuel--.

Col. 8, Claim 5, line 48 thereof, replace "or sulfur" with --to sulfur--.

Signed and Sealed this

Twenty-sixth Day of March, 1991

Attest:

HARRY F. MANBECK, JR.

*Attesting Officer*     *Commissioner of Patents and Trademarks*